Aug. 15, 1933.    R. BERTHON    1,922,615
CONTINUOUS PROCESS AND DEVICE FOR REPRODUCING
PRINTS BY CONTACT ON GAUFFERED FILMS
Filed March 12, 1931
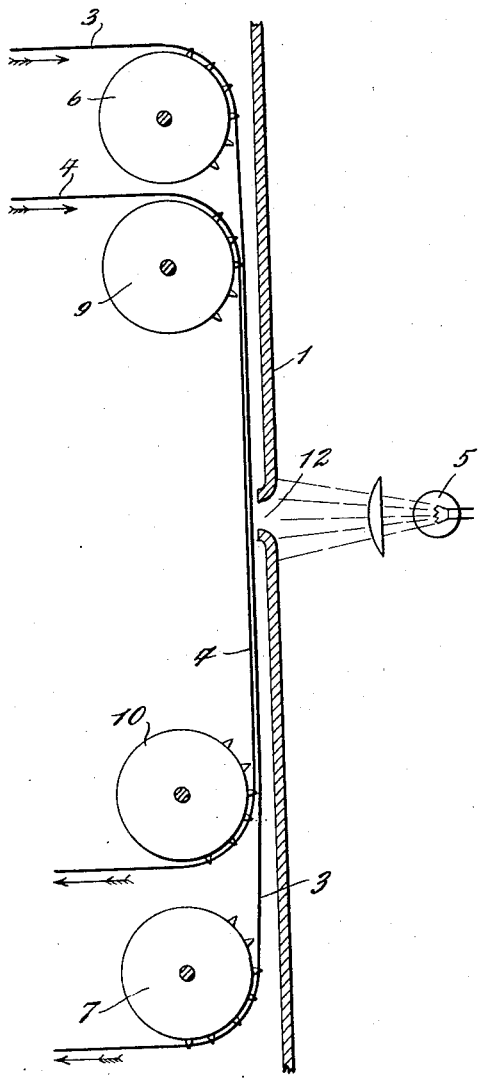
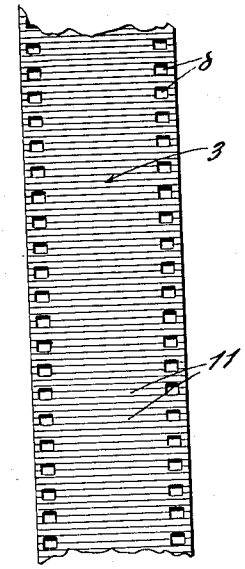
INVENTOR
Rodolphe Berthon
BY
Gifford, Scull & Burgess
ATTORNEYS Patented Aug. 15, 1933

1,922,615

UNITED STATES PATENT OFFICE 1,922,615

CONTINUOUS PROCESS AND DEVICE FOR REPRODUCING PRINTS BY CONTACT ON GAUFFERED FILMS

Rodolphe Berthon, Neuilly sur Seine, France, assignor to Kislyn Corporation, a Corporation of Delaware Application March 12, 1931, Serial No. 522,137, and in France March 19, 1930

2 Claims. (Cl. 95—75)

A process and device have already been described for reproducing by contact, prints on gauffered films, this process consisting essentially in moving the original film and the film to be reproduced, in contact with one another so that, when illuminated, the reproduction film will slide with respect to the original film, over the width of a groove or of half a groove, this sliding being effected transversely to the direction of said grooves.

A device for carrying out above process has equally been described, adapted to films, both original and reproduction film being gauffered in longitudinal direction, this device being characterized in that both films move in gates, slightly inclined in respect to one another, the angle between these films being of the order of one degree or less, the combined films being secured by an opaque plate, provided with a rectangular aperture at the intersection of the films, the heights of the aperture being suitably dimensioned.

The object of the present invention is the application of the same process to colour films, the refracting gauffering of which is transversal, i. e. perpendicular to the margins of the film.

According to this process, the sliding of the reproduction film in respect to the original film may be effected in a direction perpendicular to the refracting elements in the present case this sliding therefor being in the direction of the length of both films.

The invention may be practiced with any suitable apparatus, an illustrated embodiment of which is shown in the accompanying drawing in which:

Fig. 1 is a vertical sectional view through such an apparatus;

Fig. 2 is a face view of one of the films appearing in Fig. 1.

In Fig. 1, the numeral 1 indicates a plate having an exposure aperture 2 past which the films 3 and 4 may be moved and exposed from a source of light 5, as well known in the art. The film 3 is the original film and the film 4 is the copy film, the film 3 being shown as fed past the aperture by means of sprockets 6 and 7 disposed on opposite sides of the aperture and having teeth engaging perforations 8 therein. Similarly, the film 4 may be fed past the aperture by means of sprockets 9 and 10 in the same way.

Each film is provided with lenticulations 11, as shown in Fig. 2, extending transversely of the film. While these lenticulations are shown extending at right angles to the longitudinal axis of the film, of course, this exact relation is not necessary. The films 3 and 4 are disposed parallel to each other and then, as noted above, the two films may be fed at slightly different speeds. This may be accomplished by any suitable mechanism which will cause the sprockets 6 and 7 to move at slightly faster or slightly slower speed than the sprockets 9 and 10. Any suitable mechanism may be used for the purpose, and it is not deemed necessary to further illustrate or describe it herein.

It is immediately seen that in order to carry out this sliding motion, only two films must be employed the spacing of the perforation of which differs for each film, and to adjust the width of the illuminating aperture, with respect to said spacing. Another similar means would consist to use for driving each of the films, pinions having slightly different diameters. In either case it is seen that the films are moved at slightly different speeds, the result being a slight movement of one film relatively to the other in a direction lengthwise of the films but substantially normal to the refracting elements thereon, which elements are, as is well known in the art, usually in the form of surface lenticulations.

The slight angular crossing of films, which would be necessary in the case of two longitudinally lineated films, is of course useless in the case of transversely lineated films.

While I have shown the invention as embodied in a specific form, it is to be understood that various changes in details may be made without departing from the scope of the invention, and I therefore do not intend to limit myself except by the appended claims.

What is claimed:

1. The method of copying pictures from one film to another, both of which films have lenticulations extending transversely of their lengths, which comprises feeding said films substantially in contact past a source of light at slightly different speeds.

2. The method of copying pictures from one film to another, both of which films have lenticulations extending transversely of their lengths, which comprises feeding said films substantially in contact past a source of light while causing a slight movement of one film relatively to the other in a direction lengthwise of the films.

RODOLPHE BERTHON.